(12) United States Patent
Oberheim

(10) Patent No.: US 8,499,672 B2
(45) Date of Patent: Aug. 6, 2013

(54) POWER MITER SAW WITH HINGE LINKAGE LINEAR GUIDES

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 1550 days.

(21) Appl. No.: 11/284,931

(22) Filed: Nov. 22, 2005

(65) Prior Publication Data

US 2007/0113718 A1    May 24, 2007

(51) Int. Cl.
*B26B 5/08* (2006.01)
(52) U.S. Cl.
USPC .................................. 83/581; 83/485; 83/486
(58) Field of Classification Search
USPC ............ 83/485, 486, 486.1, 484, 483, 471.3, 83/473, 477.1, 490, 581
See application file for complete search history.

(56) References Cited

U.S. PATENT DOCUMENTS

| | | | |
|---|---|---|---|
| 1,707,764 A | 4/1929 | Mattison | |
| 1,765,733 A | 6/1930 | Olsen | |
| 2,007,563 A | 7/1935 | Koning | |
| 2,569,354 A * | 9/1951 | Tracy | 248/662 |
| 2,708,952 A | 5/1955 | Blackwell | |
| 4,587,875 A | 5/1986 | Deley | |
| 4,862,781 A | 9/1989 | Lauffer | |
| 4,892,022 A | 1/1990 | Cotton et al. | |
| 5,257,570 A | 11/1993 | Shiotani et al. | |
| 5,265,510 A * | 11/1993 | Hoyer-Ellefsen | 83/471.3 |
| 5,365,812 A | 11/1994 | Harnden | |
| 5,438,899 A | 8/1995 | Hoyer-Ellefsen | |
| 5,791,224 A | 8/1998 | Suzuki | |
| 5,839,339 A | 11/1998 | Sasaki et al. | |
| 5,870,939 A | 2/1999 | Matsubara | |
| 6,532,853 B1 | 3/2003 | Kakimoto et al. | |
| 7,059,228 B2 * | 6/2006 | Chang | 83/471.2 |
| 2002/0066346 A1* | 6/2002 | Gass et al. | 83/58 |
| 2004/0069109 A1 | 4/2004 | Sprague | |
| 2005/0028660 A1 | 2/2005 | Chin-Chin | |
| 2005/0056128 A1 | 3/2005 | Chang | |

FOREIGN PATENT DOCUMENTS

| | | |
|---|---|---|
| AU | 48871/85 | 4/1986 |
| DE | 26 16 608 | 10/1977 |

* cited by examiner

Primary Examiner — Robert Scruggs
(74) Attorney, Agent, or Firm — Maginot, Moore & Beck

(57) ABSTRACT

A power miter saw comprises a saw base having a fence for positioning a work piece, a table rotatably connected to the saw base; a miter arm assembly for angularly positioning the table relative to the saw base, a saw blade and motor assembly operatively connected to the table, a linear guide mechanism attached to the table and being configured to support the saw blade and motor assembly and enable movement of the assembly along a predetermined linear path in either forward or rearward directions, the mechanism having a horizontal shaft about which the assembly is pivotable to move a saw blade vertically into and out of cutting position, the mechanism also having a multiple link hinge pivotally interconnecting the motor assembly and the table with horizontal shafts that are parallel to one another.

20 Claims, 12 Drawing Sheets

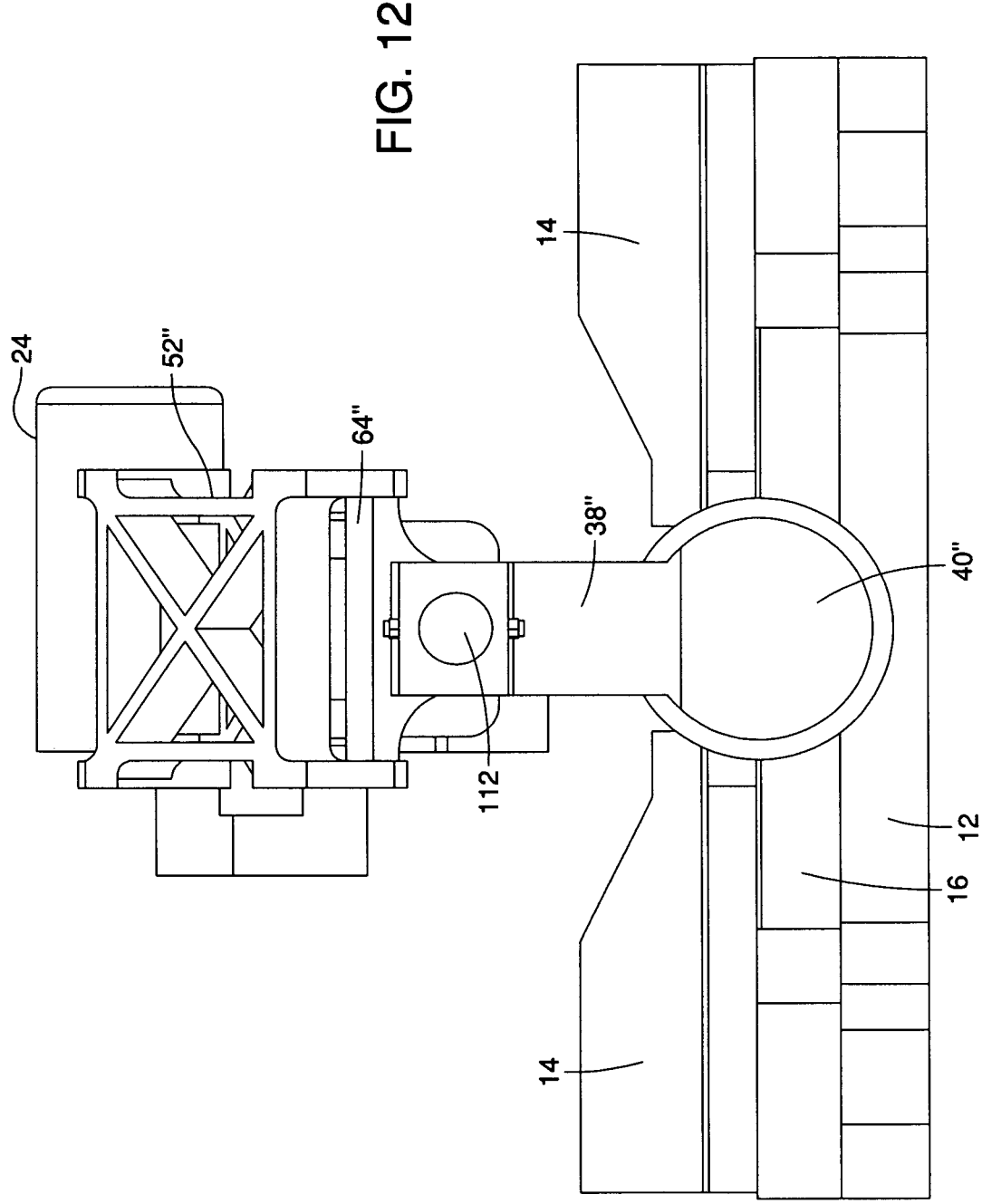

POWER MITER SAW WITH HINGE LINKAGE LINEAR GUIDES

BACKGROUND OF THE INVENTION

The present invention generally relates to power miter and abrasive cut off saws.

Miter saws have been the subject of continued research and development efforts in the power tool arena for decades, and many improvements have been made that has resulted in increased ease of use and productivity. Artisans who install trim carpentry have used power miter saws for some time and it is well known that wide stock such as crown molding and the like often requires a miter saw with either a bigger saw blade or a configuration that enables the blade to be moved along a horizontal path away and toward the fence of the miter saw. Such blade moving configurations are generally marketed as sliding compound miter saws, principally because most if not all commercially available saws of this type have a sliding guide assembly comprised of elongated rods that slide in respective bushings to move the saw blade and motor assembly relative to the fence of the saw.

Such sliding guide assemblies are an expensive component of such miter saws. The current state of the art for such sliding miter saws includes a linear guide that typically consists of two of such bushings and rod combinations. These relatively expensive linear bearings consist of recirculating ball bearings that operate together with turned, ground, polished and hardened steel rods that are approximately 40 cm long and 30 mm in diameter. To have minimum play and deflection of the saw blade and motor assembly, precise fits are required between the rods and the linear recirculating ball bearings over the entire linear travel of the rods. The rod must be made of a high hardness steel to prevent indentation by the hard steel balls. Such construction is relatively expensive.

Additionally, an undesirable feature of such bushing and rod linear guides is that space must be provided behind the saw for the rods to extend when the saw blade is positioned near the fence. Because of this space requirement, such a sliding saw cannot be put next to a wall which results in a larger footprint being occupied by such a saw. Additionally, these bushings and rod linear guide mechanisms are susceptible to damage from dirt and grit, particularly if the saw is a sliding abrasive cut off saw where an abrasive wheel is used to cut steel and other materials. The abrasive wheel grinds its way through the steel and produces a considerable volume of abrasive particles that generally come out of the back of the saw. These abrasive particles can penetrate into the ball bushings and damage the bearing. While it is possible to cover the rods with a bellows or similar cover, the hostile environment generally leads to degradation of the fabric and penetration of the ball bushing by the abrasive particles.

There is a continuing need for improvement in the design and development of miter and cut-off saws that have linear guide assemblies.

SUMMARY OF THE INVENTION

A power miter saw comprises a saw base having a fence for positioning a work piece, a table rotatably connected to the saw base; a miter arm assembly for angularly positioning the table relative to the saw base, a saw blade and motor assembly operatively connected to the table, a linear guide mechanism attached to the table and being configured to support the saw blade and motor assembly and enable movement of the assembly along a predetermined linear path in either forward or rearward directions, the mechanism having a horizontal shaft about which the assembly is pivotable to move a saw blade vertically into and out of cutting position, the mechanism also having a multiple link hinge pivotally interconnecting the motor assembly and the table with generally horizontal shafts that are parallel to one another.

DESCRIPTION OF THE DRAWINGS

FIG. 12 is a rear view of the embodiment shown in FIG. 9, with the saw blade located away the fence.

DETAILED DESCRIPTION

Figure 1:
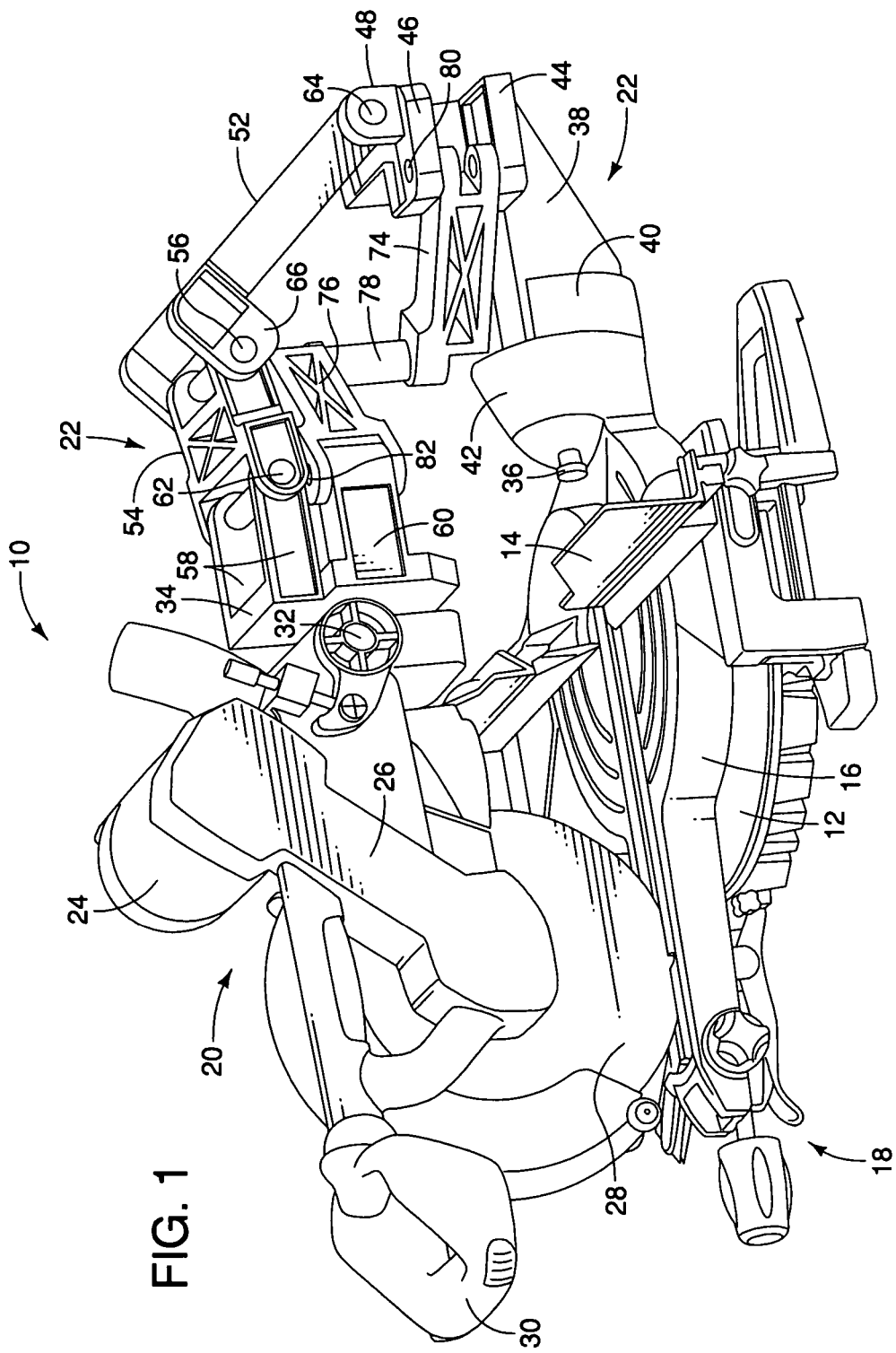
FIG. 1 is a right side perspective view of a first preferred embodiment of the present invention, particularly illustrating the saw blade being located in the extended position away from the fence.

Three embodiments of the present invention are shown and described herein, with the each of the three embodiments having a multiple hinge linkage that is designated herein as a horizontal hinge linkage that interconnects the saw blade and motor assembly to the table of the miter saw. It should be understood that while it is referred to herein as a generally horizontal hinge linkage, the several shafts of the linkage may not always be exactly horizontal, and may have a pivot axis that can vary up to about 30 degrees in either direction from exact horizontal. However, it is preferred that the axes be in a substantially horizontal orientation when the saw is set at a zero degree bevel position. Regardless of the bevel angle or the orientation of the surface on which the saw is supported, the shafts are preferably substantially parallel to the arbor shaft in which the blade is mounted and therefore substantially perpendicular to the plane of the saw blade.

The horizontal hinge linkage is utilized rather than an elongated rod and bushing configuration and provides increased stiffness to undesired movement of the saw blade arising from structural deflections during cutting operations. Two of the three embodiments also have a vertical hinge linkage for maintaining the elevation of the saw pivot head (to which the saw blade and motor assembly is attached) constant during movement of the saw blade and motor assembly away and toward the fence during a cutting operation. A third preferred embodiment utilizes the horizontal hinge linkage together with a single rod and bushing arrangement whereby the rod and bushing arrangement also maintains a constant elevation of the saw pivot head as the saw blade and motor assembly is moved toward and away from the fence during a cutting operation. It should be understood that the saw blade and motor assembly 22 is pivotable about a saw pivot that is part of the saw pivot head, which is attached to the horizontal hinge linkage. The saw blade and motor assembly can be pivoted up out of contact with a work piece or moved down into contact with a work piece during a cutting operation as is conventional for miter saws.

Such hinge linkages have a cost advantage compared to conventional bushing and rod guides because they have a simpler construction, which may comprise as few as two generally planar shaped linkages that are connected together by shafts that may preferably incorporate rotary bushings or low cost ball bearings and which are also linked to the support frame of the rotatable table as well as to the saw pivot head. Tight tolerance fits between hinge components are relatively easier to achieve using low cost ball bearings that are preloaded in the axial direction so that nearly all axial and radial play is removed. In contrast, conventional bushings and sliding rod systems require expensive manufacturing processes to ensure that the outside surface of the rod is precise over its entire length. Another advantage of the use of hinge linkages is that their stiffness characteristics are determined primarily from the width of the hinge linkages as measured along the pivot, i.e., shaft axis. Thus, increased system stiffness can be achieved by making the hinge larger and this is generally less expensive than using larger rods and bushings.

As previously mentioned, the horizontal hinge linkage pivots around axes that are perpendicular to the cutting plane of the blade and therefore provides increased stiffness along the axis of rotation of the saw blade and because of this desirable characteristic, the length of the hinge shafts is greater than other shaft lengths such as those used in the vertical hinge linkage. The structural stiffness is very important to the quality of cuts made by the saw. Without the requisite structural stiffness, it is common for the saw blade to deflect out of the desired cutting plane on an intermittent basis which can result in one or more cut discontinuities or jagged cut portions, rather than a continuous smooth cut at the desired angle.

Another advantage of the hinge linkage is that it has greatly reduced sensitivity to dirt and grit because the bearing surfaces of a hinge linkage are not exposed but are contained within a ball bearing or short rotary bushing. Such ball bearing or rotary bushings can be relatively easily sealed compared to a rod and bushing system where the entire rod is a critical bearing surface and therefore has to be sealed with a large accordion or bellow shaped fabric or other type of cover which is often easily damaged.

Turning now to the first preferred embodiment shown in FIGS. 1-4, the miter saw, indicated generally at 10, has a generally circular base 12 with an attached fence 14, which base supports a rotatable table 16 that has a miter arm control assembly, indicated generally at 18, for adjusting the rotational position of the table for setting the miter angle of work piece that would be placed on the table 16. A saw blade and motor assembly, indicated generally at 20, is operatively connected to the table 16 by a linear guide mechanism, indicated generally at 22. The saw blade and motor assembly 20 has an electric motor 24 that is operatively connected through a gear mechanism, not shown but located within housing portion 26 that drives a saw blade 28. A handle 30 enables an operator to move the blade and motor assembly 20 into and out of engagement with a work piece that may be placed on the table 16 adjacent the fence 14. The blade and motor assembly 20 is pivotable about a saw pivot shaft 32 that is connected to a saw pivot head 34 to which the linear guide mechanism 22 is attached. The blade and motor assembly 20 is shown in FIG. 1 to be in a position where the blade is moved to its extended position away from the fence 14 and lowered into cutting position were a work piece placed on the table 16. During operation, an operator places a work piece on the table 16, brings the handle 30 down into cutting position either before or after activating the motor 24 and then pushes the handle 30 toward the fence 14 to have the blade 28 cut the work piece. At the end of the cut, the blade and motor assembly 20 would be essentially in the position shown in FIG. 2 where the bottom reach of the blade 28 is generally coextensive with the fence 14.

The linear guide mechanism 22 of the first preferred embodiment shown in FIGS. 1-4 is designed so that the miter saw has a dual bevel operation, rather than a single bevel operation, meaning that the bevel angle can be adjusted either right or left from the normal zero angle or position wherein the plane of the blade 28 is perpendicular to the plane of the top surface of the table 16. The blade and motor assembly 20 as well as the linear guide mechanism and rotate about a bevel pivot shaft 36, with the linear guide mechanism having a support frame 38 with a generally cylindrical end portion 40 to which the bevel pivot shaft 36 is connected to. The shaft 36 extends through an opening in an enlarged extension 42 of the table 16. Thus, the end portion 40 can rotate relative to the extension 42 and be supported by the shaft 36. The support frame 38 is preferably a casting that has a lower flange 44, an upper flange 46 as well as vertically oriented flanges 48 and 50.

A horizontal hinge linkage is comprised of links 52 and 54 which have adjacent ends connected together by a shaft 56. The saw pivot head 34 has a pair of spaced flanges 58 as well as a single flange 60 located below the flanges 58. The link 54 has its opposite end connected to the flanges 58 by a shaft 62. Similarly, the opposite end of the link 52 is connected to the vertical flanges 48 and 50 by a shaft 64. As previously mentioned and while not specifically illustrated, the shafts 32, 62, 56, 64, 78 and 82 are preferably of the type which utilize rotary bushings or low cost ball bearings so that they are freely rotatable and will have an extended useful life.

Figure 2:
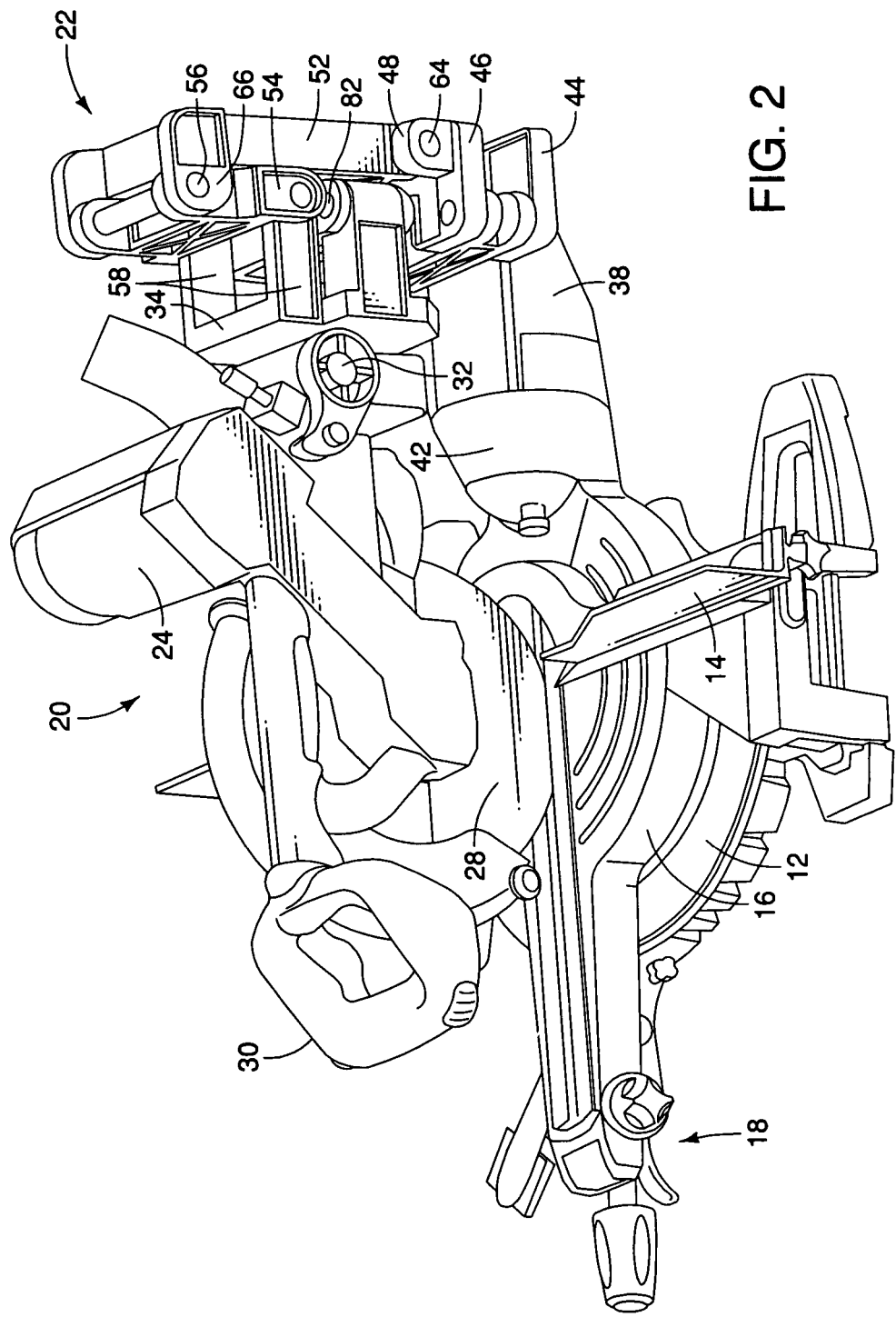
FIG. 2 is a right side perspective view of the embodiment shown in FIG. 1, but illustrating the saw blade in a position near the fence.
Figure 3:
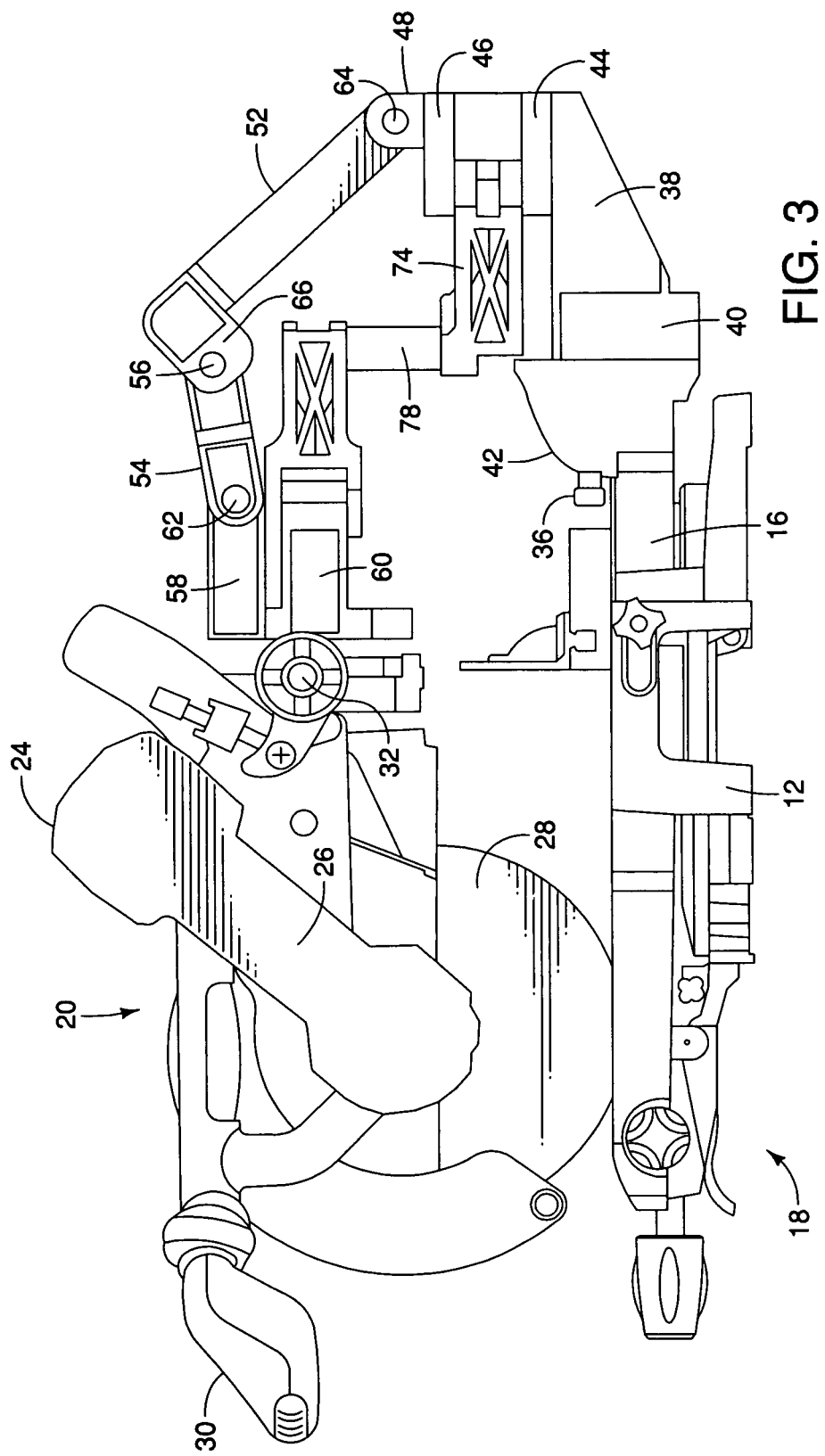
FIG. 3 is a side elevation of the embodiment shown in FIG. 1 with the saw blade in the extended position away from the fence.
Figure 4:
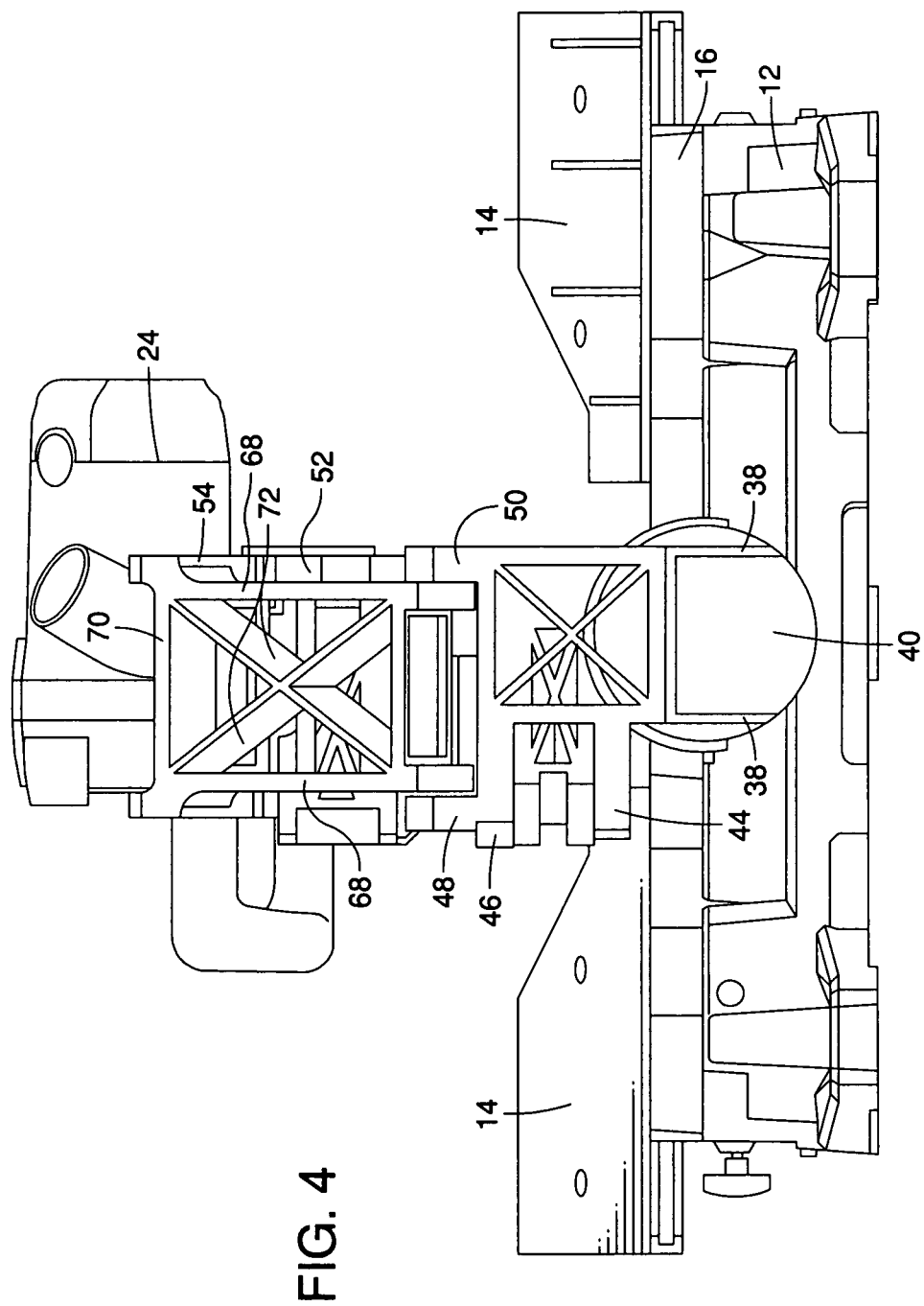
FIG. 4 is a rear view of the embodiment shown in FIG. 1, with the saw blade away from the fence.
Figure 5:
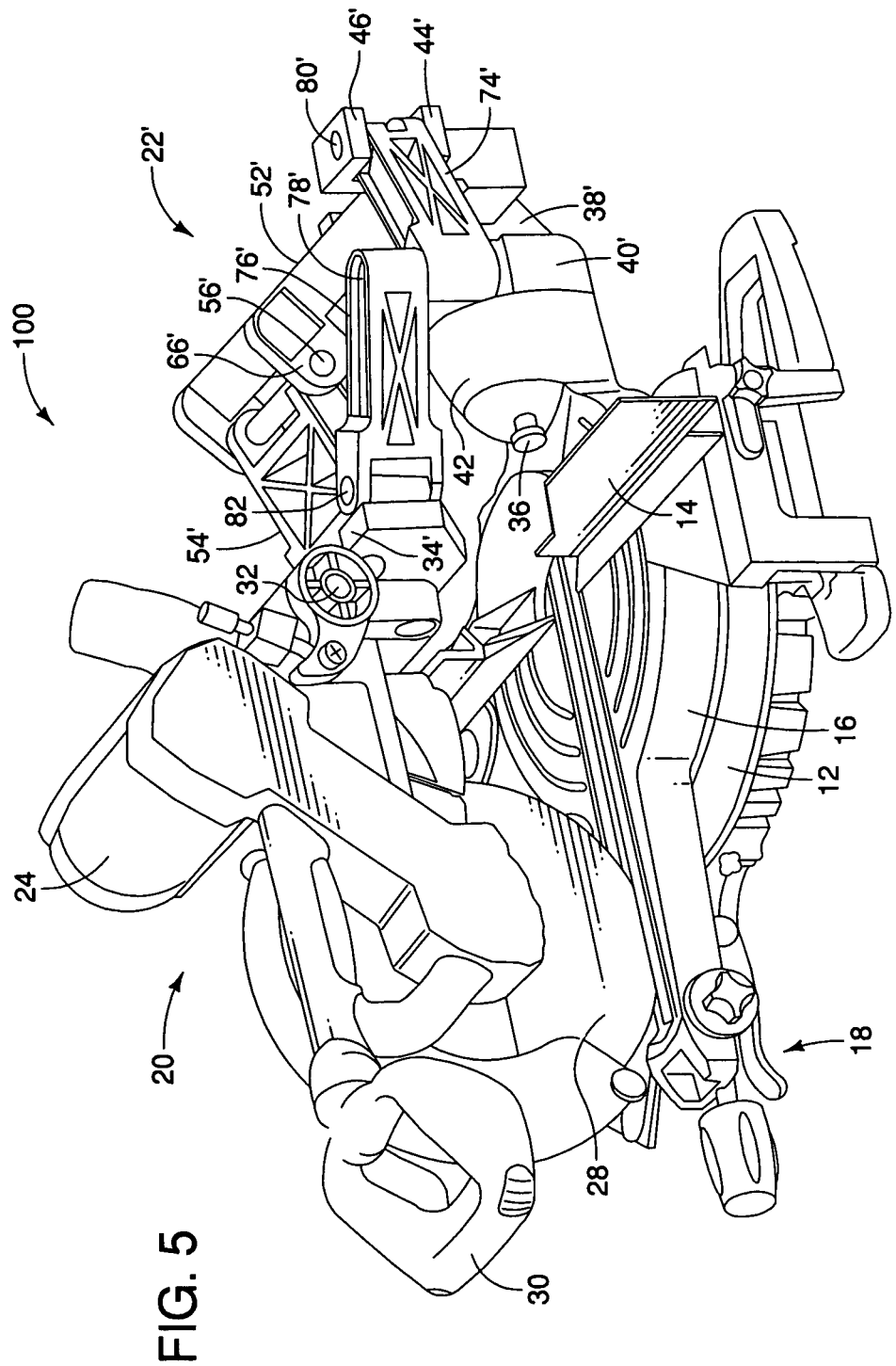
FIG. 5 is a right front perspective view of a second preferred embodiment of the present invention, particularly illustrating the saw blade being located in the extended position away from the fence.

As is best shown in FIGS. 1 and 2, the link 52 has a generally L-shaped side configuration with the transverse extension 66 having the aperture in which the shaft 56 is located. This permits the two links 52 and 54 to be folded together in a generally parallel arrangement as shown in FIG. 2 when the blade and motor assembly 20 is moved into its final cutting position where the blade is adjacent to the fence 14. As is best shown in FIG. 4, the width of the links 52 and 54 is relatively large and therefore the shafts 56, 62 and 64 that interconnect the links 52 and 54 with one another and with the saw pivot head 34 and support frame 38 are relatively long. This contributes to the desirable stiffness of the linear guide mechanism which substantially reduces, if not eliminates, any movement by the blade out of the cutting plane which can result in poor quality cutting. Stated in other words, the extremely wide links and their coupling to the saw pivot head and support frame 38 results in high rigidity reducing torsional and linear deflection of the saw blade away from its intended cutting plane which is very desirable from a cut quality standpoint.

As best shown in FIG. 4, the link 52 is not a solid construction, but has side walls 68 and end walls 70 with cross braces 72 provided to provide increased overall strength for the link. The link 54 is similarly constructed as is shown in FIG. 1, it also having similarly configured side walls, end walls and cross braces. The hinge links 52 and 54 are preferably die cast aluminum but can be steel stamping if desired.

The vertical hinge linkage is located below the horizontal hinge linkage and it comprises links 74 and 76 which have adjacent ends connected together by a vertical shaft 78. The links 74 and 76 are not as wide as the horizontal hinge links 52 and 54 for the reason that their functionality is to maintain the elevation of the saw pivot head 34 constant during movement of the blade and motor assembly 20 toward and away from the fence 14. Elevational deflections are not as critical for a miter saw cut quality for the reason that the work piece is generally being completely cut through.

The narrower links 74 and 76 are vertically displaced from one another which requires the elongated vertical shaft 78 to extend to interconnect them. The link 74 is located between the horizontal flanges 44 and 46 and is pivotally connected to these flanges by a shaft 80. Similarly, the link 76 has spaced flange portions that are connected to the flange 60 by a shaft 82. As is shown in FIG. 1, the flange 60 is located beneath the near flange 58 and the flanges 44 and 46 are also located beneath the vertical flanges 48 and 50, and the shaft 78 that interconnects the links 74 and 76 extends away or to the left side of the saw (as viewed from the handle 30) so that when the vertical and horizontal linkages are folded together as shown in FIG. 2, little if any portion of the links extend outside of the width of the flanges 48 and 50. This is significant in that changing of the bevel angle of the blade and motor assembly 20 can be accomplished in either the left or right direction and the hinge linkages will not interfere with the dual bevel adjusting capability.

It should also be apparent from FIG. 2 that when the blade and motor assembly 20 are moved as far toward the fence 14 as is possible, the linkages do not extend in any rearward direction beyond the original position end of the support frame 38. This enables the miter saw to be placed near a wall, for example, and be fully operational, unlike many conventional sliding rod and bushing configurations of compound miter saws.

A second preferred embodiment is shown in FIGS. 5-8 and have many similar components as the embodiment shown in FIGS. 1-4. In the following description, components that are labeled with the same numbers as those shown and described with regard to the first preferred embodiment are substantially similar in their design, configuration and operation and therefore will not be described in detail. Components with reference numbers having a prime or double prime designation are similar to those that are identified with regard to the embodiment shown in FIGS. 1-4, but may have some structural differences which are apparent or which will be generally described or which will be given different numbers than those illustrated in FIGS. 1-4.

Figure 6:
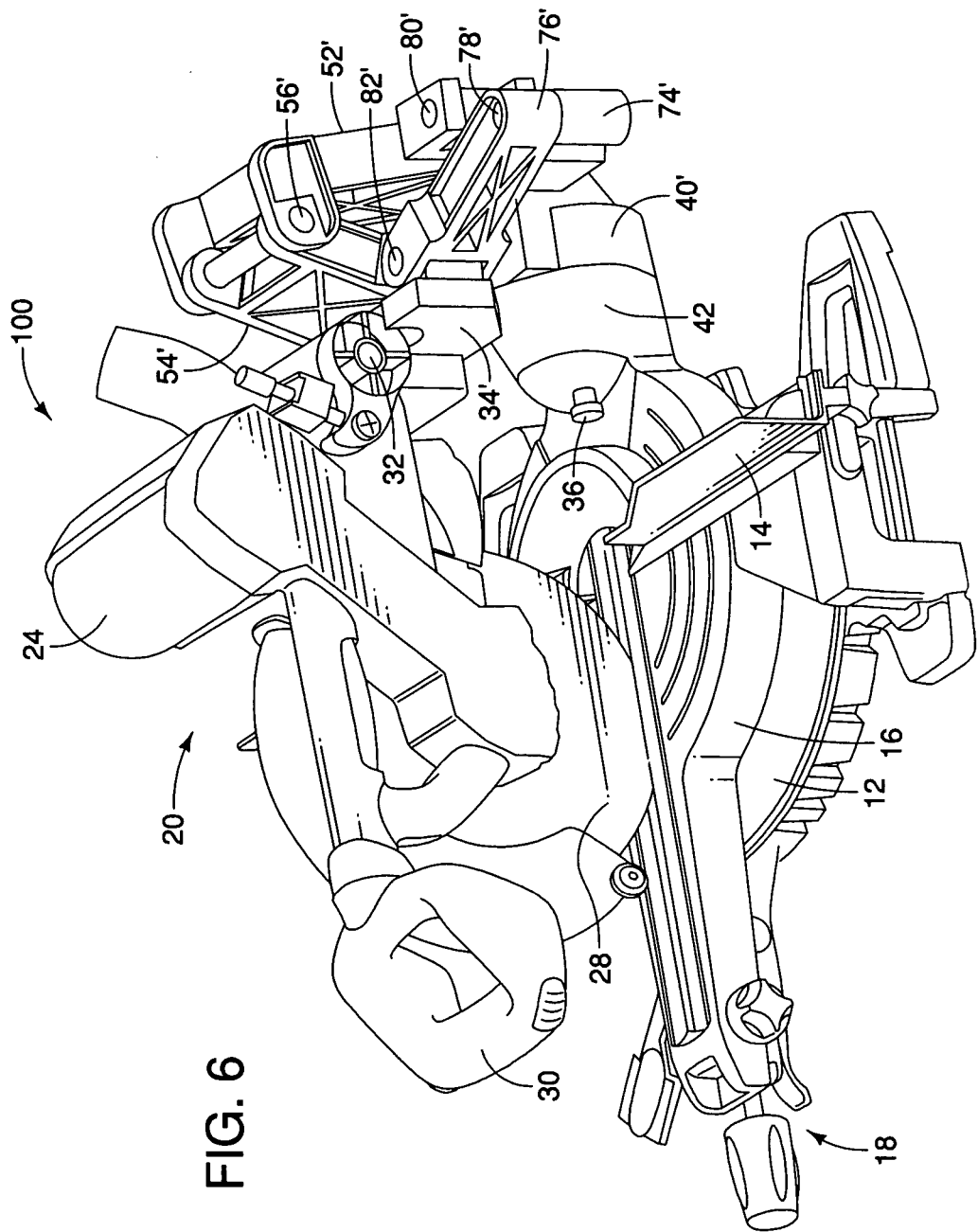
FIG. 6 is a right front perspective view of the embodiment shown in FIG. 5, but illustrating the saw blade in a position near the fence.
Figure 7:
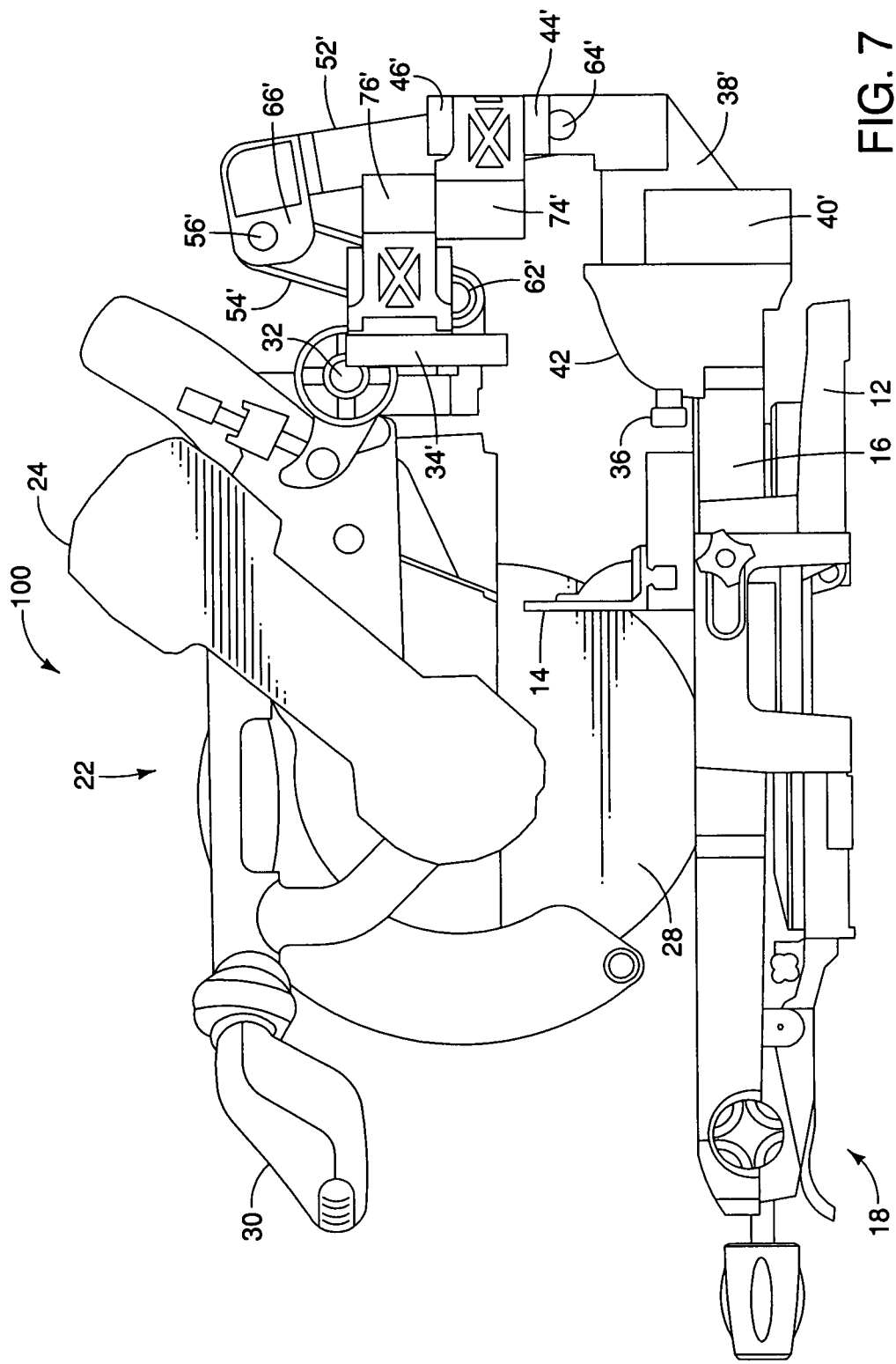
FIG. 7 is a side elevation of the embodiment shown in FIG. 5 but illustrating the saw blade in a position near the fence.
Figure 8:
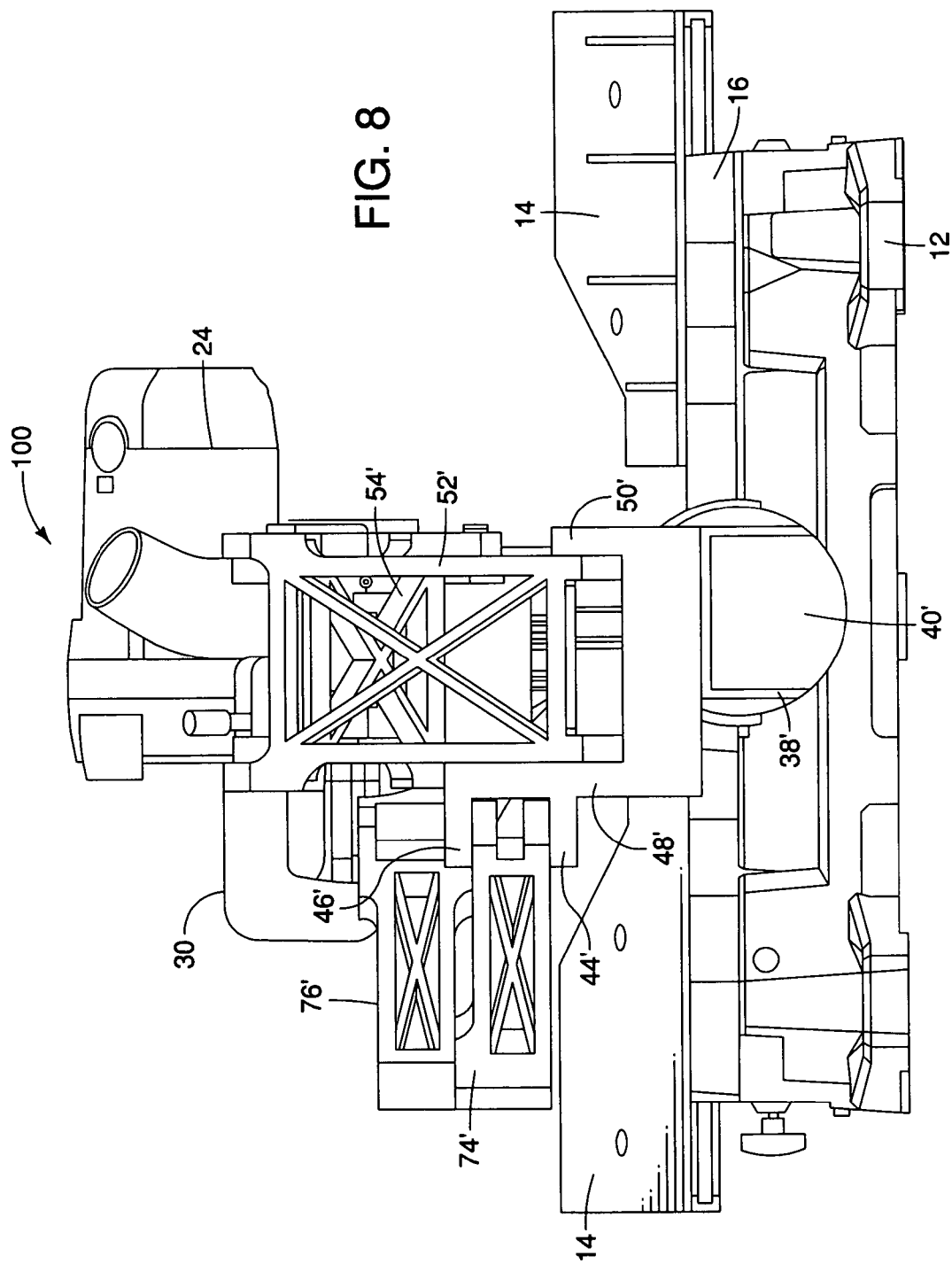
FIG. 8 is a rear view of the embodiment shown in FIG. 5, with the saw blade in a position away from the fence.
Figure 9:
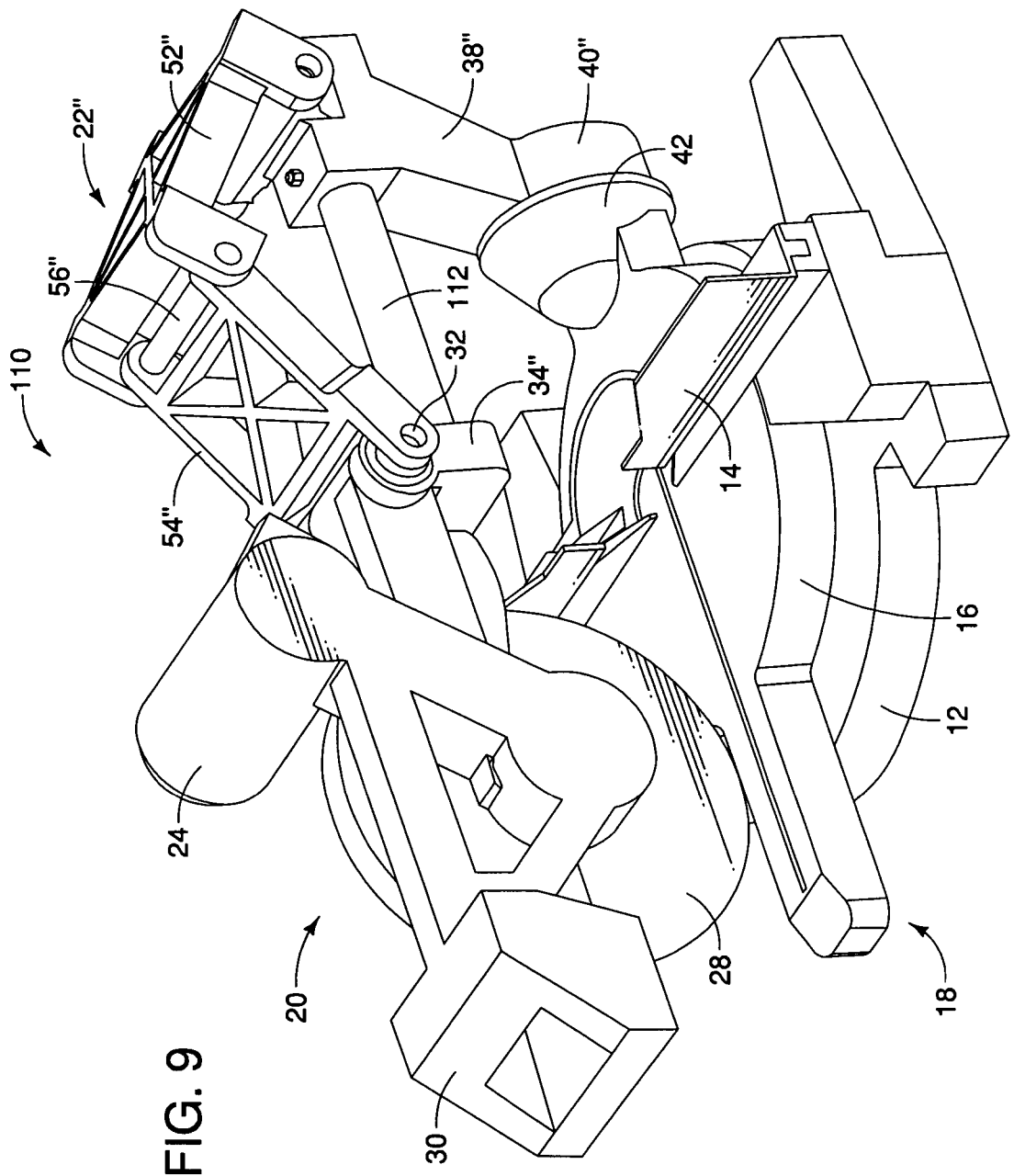
FIG. 9 is a third preferred embodiment of the present invention, particularly illustrating the saw blade being located in the extended position away from the fence.
Figure 10:
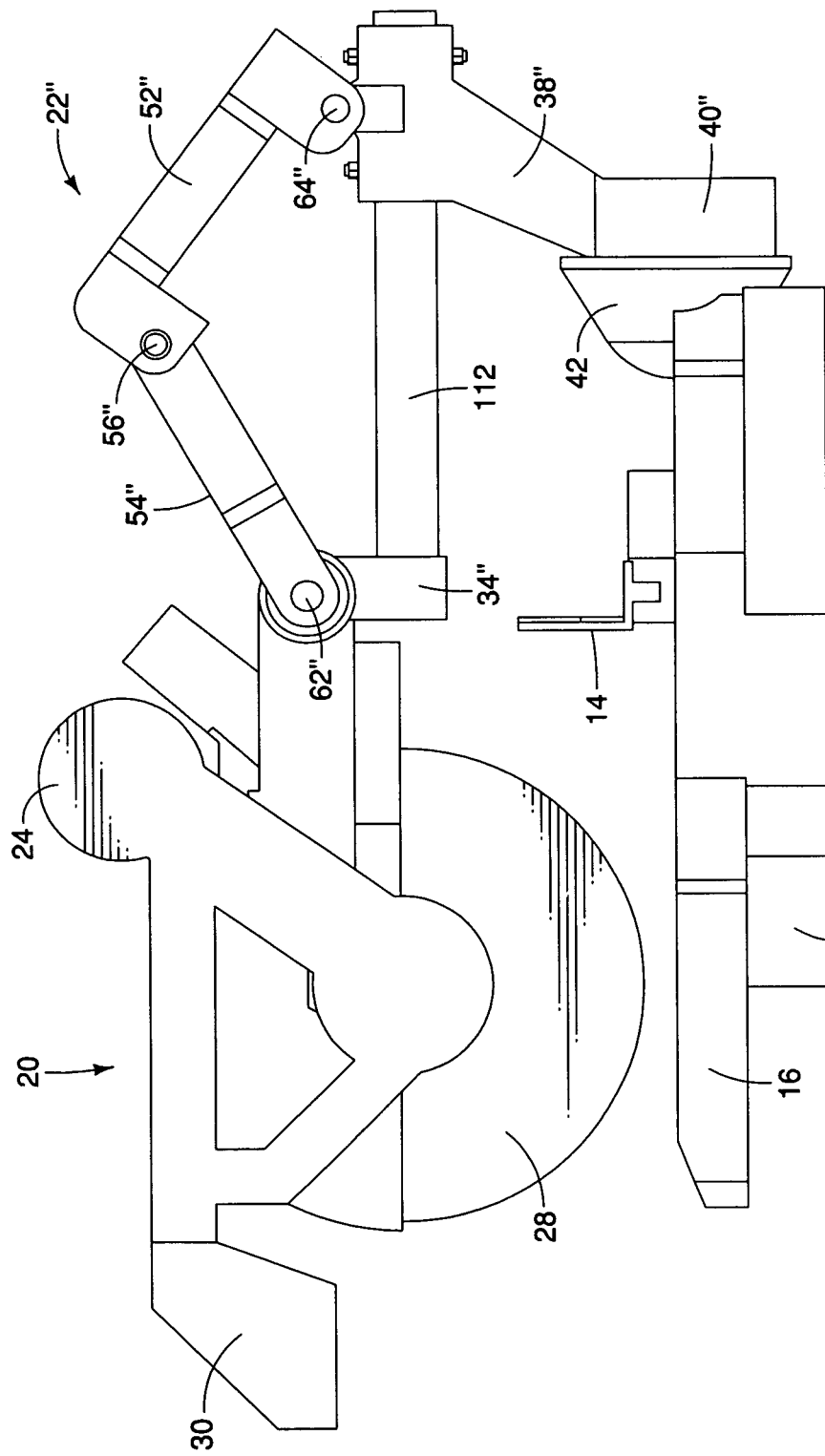
FIG. 10 is a side elevation of the embodiment shown in FIG. 9 with the saw blade in the extended position away from the fence.
Figure 11:
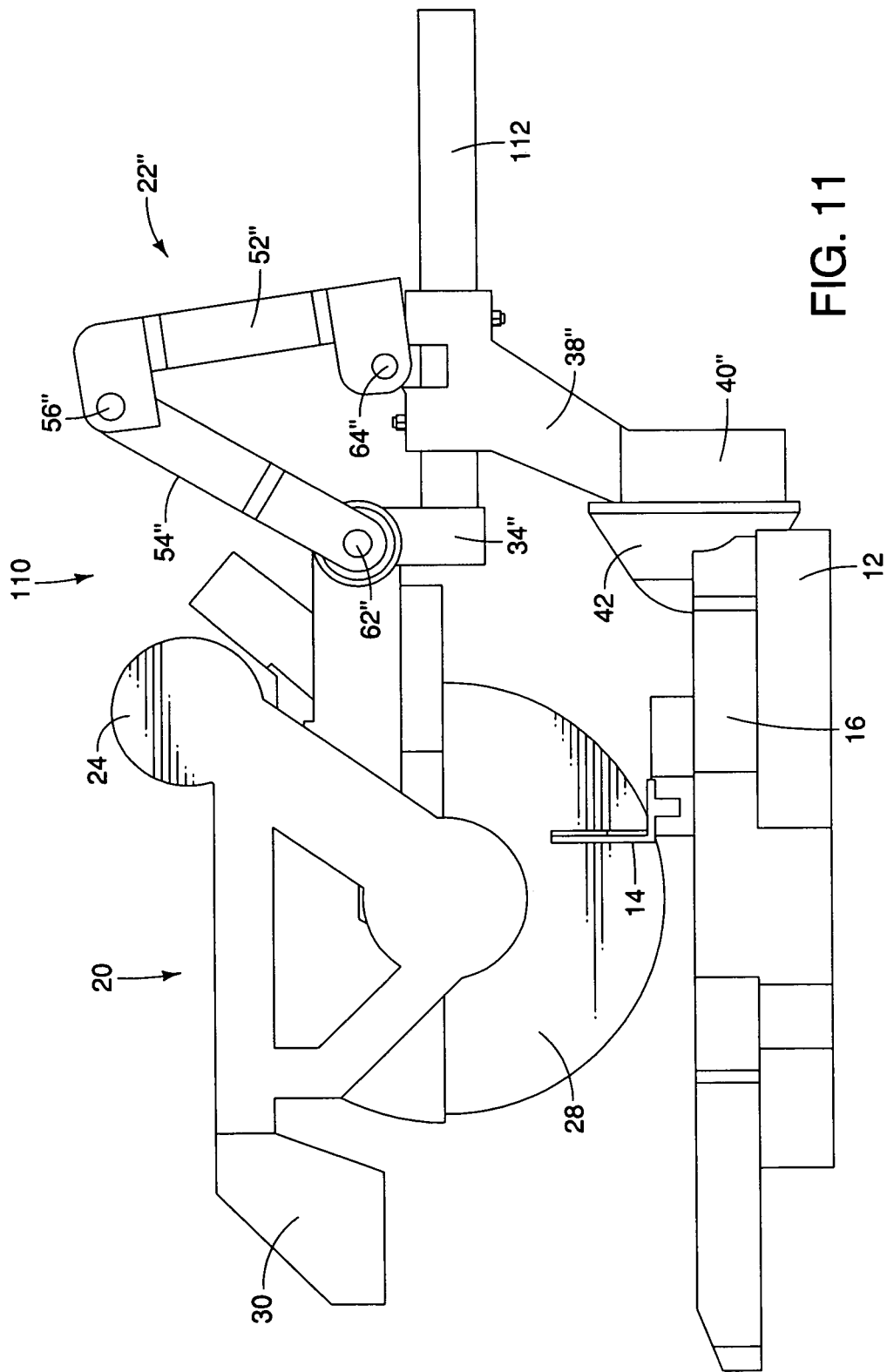
FIG. 11 is another side elevation of the embodiment shown in FIG. 9, with the saw blade near the fence.

The second preferred embodiment is indicated generally at 100 in FIGS. 5-8 and has many similarities to the first preferred embodiment, but while the first embodiment is a dual bevel configuration saw, the second embodiment saw 100 is a single bevel configuration. The links 74' and 76' are connected together by a shaft 78' that is not as long as the shaft 78 of the first preferred embodiment, because the links 74' and 76' are vertically adjacent one another rather than being spaced apart. Also, the link 76' is at an elevation that is substantially similar to the elevation of the link 54' and therefore unable to fold toward the link 52" and 54'. Thus, the connection between link 74' and 76' extends outwardly away from the links 52' and 54'. Because of the outward extension, particularly when it is folded as shown in FIGS. 6 and 8, the links interfere with other portions of the saw 100 when the saw would be pivoted in the counterclockwise direction as shown in FIG. 8. Therefore, the single bevel operation of this second preferred embodiment is in the clockwise direction as shown in FIG. 8.

A third preferred embodiment of the invention is the saw 110 that is shown in FIGS. 9-12 is less detail than the embodiments of FIGS. 1-8. Saw 110 has a horizontal hinge linkage comprising links 52" and 54" that are interconnected and operate substantially similar to those described in the embodiments of FIGS. 1-8. The saw pivot head 34" has a slightly different configuration and the end of the link 54" is connected to the saw pivot shaft 32 which is also journaled in the saw pivot head 34". An elongated rod 112 is journaled in a bushing (not shown but located in the upper end of support frame 38) and maintains the saw pivot head 34" at a constant elevation as the blade and motor assembly 22 moves the blade 28 toward the fence 14. Only one rod 112 is provided for the reason that control of the saw blade cutting plane is provided by the horizontal hinge linkage, as is the case with the other embodiments shown in FIGS. 1-8, and the only function that is performed by the rod 112 is to keep the pivot head 34" at a constant elevation during operation. In this regard, the blade and motor assembly 20 is shown in its retracted position in FIGS. 9 and 10 and in the cutting position in FIG. 11 where the blade 28 is adjacent the fence 14. In the position shown in FIG. 11, it is apparent that the rod 112 will extend beyond the rear surface of the support frame 38" which requires a larger footprint in that it would not be possible to place the saw 110 with the support frame 38" located close to a wall or other similar surface. Thus, while this embodiment does not have the space advantages of the first and second preferred embodiments, this embodiment has the advantage of controlling the saw blade cutting plane by a generally horizontal hinge as is achieved in all embodiments and only one rod and bushing combination is required which provides a cost benefit compared to conventional arrangements which have a pair of rod and bushing configurations.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power miter saw comprising:
   a saw base having a fence for positioning a work piece;
   a table rotatably connected to said saw base;
   a miter arm assembly for angularly positioning said table relative to said saw base;
   a saw blade and motor assembly operatively connected to said table;
   a linear guide mechanism attached to said table and being configured to support said saw blade and motor assembly and enable movement of said assembly along a predetermined linear path in either forward or rearward directions;
   said mechanism having a first horizontal shaft about which said assembly is pivotable to move a saw blade vertically into and out of cutting position;
   said mechanism having a first multiple link hinge pivotally interconnecting said assembly and said table with generally horizontal shafts that are parallel to one another and perpendicular to the plane of the saw blade, said links of said multiple link hinge having a width of at least about 3 inches to thereby impart high structural rigidity to said assembly.

2. A miter saw as defined in claim 1 wherein said generally horizontal shafts are within approximately 30 degrees in either direction from substantial horizontal.

3. A miter saw as defined in claim 1 wherein said first hinge has two hinge links pivotally connected together by a second horizontal shaft, one link also being pivotally connected by a third horizontal shaft to said table and the other link being pivotally connected by a fourth horizontal shaft to said assembly, wherein said second, third and fourth horizontal shafts are parallel to one another.

4. A miter saw as defined in claim 1 wherein said mechanism further comprises a second multiple link hinge pivotally interconnecting said assembly and said table with shafts that are parallel to one another and generally perpendicular to said generally horizontal shafts.

5. A miter saw as defined in claim 4 wherein said shafts of said second multiple link hinge are generally perpendicular to said generally horizontal shafts within approximately 30 degrees in either direction.

6. A miter saw as defined in claim 4 wherein said second multiple link hinge further comprises a third link having one end pivotally connected to said assembly and a fourth link having one end pivotally connected to said table, said third and fourth links having their respective other ends pivotally connected to one another by an elongated shaft so that the elevation of said third and fourth links is different.

7. A miter saw as defined in claim 6 wherein said first and second multiple link hinges are connected to said assembly and to said table generally at the same elevation, said interconnection of said third and fourth links extending away from said first multiple link hinge during movement along said predetermined linear path in the rearward direction.

8. A miter saw as defined in claim 6 wherein said first and second multiple link hinges are connected to said assembly and to said table generally at different elevations, such that said second multiple link hinge is below said first multiple link hinge, said interconnection of said third and fourth links extending toward and under said first multiple link hinge during movement along said predetermined linear path in the rearward direction.

9. A miter saw as defined in claim 4 wherein said second multiple link hinge further comprises a third link having one end pivotally connected to said assembly and a fourth link having one end pivotally connected to said table, said third and fourth links having their respective other ends pivotally connected to one another by one of said shafts, said third and fourth links being generally at the same elevation.

10. A miter saw as defined in claim 1 wherein said mechanism further comprises at least one elongated member that operatively engages a guide structure located in said frame to maintain said mechanism at a constant height during movement of said assembly along said predetermined linear path.

11. A miter saw as defined in claim 10 wherein said mechanism further comprises a single sliding rod that operatively engages a bushing located in said frame to maintain said mechanism at a constant height during movement of said assembly along said predetermined linear path.

12. A miter saw as defined in claim 1 wherein at least selected ones of said links comprise metal castings having apertures at both ends for receiving shafts, said castings having outer side portions and bracing portions interconnecting said side portions.

13. A power miter saw having adjustable miter and bevel angle cutting capability, comprising:
    a saw base having a fence for positioning a work piece;
    a table pivotally connected to said saw base to vary the miter angle of cut;
    a miter arm assembly for angularly horizontally positioning said table relative to said saw base;
    a saw blade and motor assembly operatively connected to said table;
    a linear guide mechanism attached to said table and being configured to support said saw blade and motor assembly and enable movement of said assembly along a predetermined linear path in either a forward or rearward direction, said mechanism being angularly adjustable to vary the bevel angle of the saw blade relative to said table;
    said mechanism having a first shaft oriented transversely relative to the plane of the blade, about which said assembly can move a saw blade into and out of position to cut the work piece;
    said mechanism having a first multiple link hinge pivotally interconnecting said assembly and said table with shafts that are parallel to one another and generally perpendicular to the plane of said blade, said links of said multiple link hinge having width of at least about 3 inches to thereby impart high structural rigidity to said assembly.

14. A miter saw as defined in claim 13 wherein said parallel shafts are within approximately 30 degrees in either direction from the plane of said blade.

15. A miter saw as defined in claim 13 wherein said first hinge has two hinge links pivotally connected together by a second shaft, one link also being pivotally connected by a third shaft to said table and the other link being pivotally connected by a fourth shaft to said assembly, wherein said second, third and fourth shafts are parallel to one another.

16. A miter saw as defined in claim 13 wherein said mechanism further comprises a second multiple link hinge pivotally interconnecting said assembly and said table with shafts that are parallel to one another and perpendicular to said blade.

17. A miter saw as defined in claim 16 wherein said second multiple link hinge further comprises a third link having one end pivotally connected to said assembly and a fourth link having one end pivotally connected to said table, said third and fourth links having their respective other ends pivotally connected to one another by an elongated shaft so that the elevation of said third and fourth links is different.

18. A miter saw as defined in claim 16 wherein said second multiple link hinge further comprises a third link having one end pivotally connected to said assembly and a fourth link having one end pivotally connected to said table, said third and fourth links having their respective other ends pivotally connected to one another by one of said shafts, said third and fourth links being generally at the same elevation.

19. A miter saw as defined in claim 13 wherein said mechanism further comprises a sliding rod that operatively engages a bushing located in said frame to maintain said mechanism at a constant height during movement of said assembly along said predetermined linear path.

20. A power miter saw having adjustable miter and bevel angle cutting capability, comprising:
    a saw base having a fence for positioning a work piece;
    a table pivotally connected to said saw base to vary the miter angle of cut;
    a miter arm assembly for angularly positioning said table to adjust the miter angle;

a motor assembly including a saw blade operatively connected to said table;

a guide mechanism attached to said table configured to support said motor assembly and limit movement of said assembly along a predetermined linear path in either a forward or rearward direction, said mechanism being angularly adjustable relative to said table to vary the bevel angle of the saw blade;

said mechanism having a first shaft oriented transversely relative to the plane of the blade, about which said assembly can move a saw blade into and out of position to cut the work piece;

said mechanism having a first wide hinge with multiple wide links having a width of at least about 3 inches and shafts that are parallel to one another and generally perpendicular to the plane of said blade, said hinge interconnecting said assembly and said table, and permitting movement of said motor assembly in opposite directions along the plane of said blade while substantially prohibiting deviation of the saw blade from its intended cutting plane.

* * * * *